(12) United States Patent
Nakayama

(10) Patent No.: US 7,506,627 B2
(45) Date of Patent: Mar. 24, 2009

(54) BALANCER SHAFT ARRANGEMENT FOR ENGINE

(75) Inventor: Yoshiharu Nakayama, Iwata (JP)

(73) Assignee: Yamaha Motor Co., Ltd., Shizuoka-ken (JP)

( * ) Notice: Subject to any disclaimer, the term of this patent is extended or adjusted under 35 U.S.C. 154(b) by 232 days.

(21) Appl. No.: 11/205,776

(22) Filed: Aug. 17, 2005

(65) Prior Publication Data
US 2006/0037576 A1    Feb. 23, 2006

(30) Foreign Application Priority Data
Aug. 17, 2004    (JP)    ............................. 2004-237336

(51) Int. Cl.
F02B 75/06    (2006.01)
F16C 3/00    (2006.01)
F16C 3/20    (2006.01)

(52) U.S. Cl. .................. 123/192.2; 464/180; 74/604

(58) Field of Classification Search .............. 74/604, 74/603; 123/43 A, 43 AA, 192.1, 192.2; 464/180
See application file for complete search history.

(56) References Cited

U.S. PATENT DOCUMENTS

| | | | |
|---|---|---|---|
| 4,028,963 A | | 6/1977 | Nakamura et al. |
| 4,480,607 A | * | 11/1984 | Tsai et al. ................ 123/192.2 |
| 5,012,775 A | * | 5/1991 | Oike ........................ 123/192.2 |
| 5,218,885 A | * | 6/1993 | Nakano et al. ................ 74/591 |
| 5,253,547 A | * | 10/1993 | Yoneyama et al. ............ 74/604 |
| 5,755,145 A | * | 5/1998 | Iwata et al. ................... 74/604 |
| 5,873,336 A | * | 2/1999 | Uchida .................... 123/90.31 |
| 6,205,970 B1 | * | 3/2001 | Iwata et al. .............. 123/192.2 |
| 6,305,339 B1 | * | 10/2001 | Iwata et al. .............. 123/192.2 |
| 6,659,061 B2 | * | 12/2003 | Nomura .................... 123/192.2 |
| 2002/0033063 A1 | * | 3/2002 | Hojyo et al. .................. 74/413 |
| 2003/0013534 A1 | | 1/2003 | Killion et al. |
| 2003/0037752 A1 | | 2/2003 | Nomura |

FOREIGN PATENT DOCUMENTS

DE    3314801 A1    10/1984
DE    37 05 346 A1    8/1987

(Continued)

OTHER PUBLICATIONS

Patent Abstracts of Japan, vol. 16, No. 191, May 8, 1992 corresponding to JP 04 025642 A, Honda Motor Co Ltd., Jan. 29, 1992.

(Continued)

*Primary Examiner*—Michael Cuff
*Assistant Examiner*—Ka Chun Leung
(74) *Attorney, Agent, or Firm*—Knobbe Martens Olson & Bear LLP

(57) ABSTRACT

An engine includes a balancer shaft that is supported at its both ends through bearings disposed within an engine crankcase. The balancer shaft lies generally parallel with a crankshaft and includes balancer weights, which are provided generally at the ends of the balancer shaft. At least one of the balancer weights is made up of first and second weight portions. The first and second weight portions are disposed on opposite sides of the corresponding bearing. In this manner, the bending moment on the shaft is reduced and, consequently, the balancer shaft can have a smaller diameter to reduce the size of the crankcase.

22 Claims, 3 Drawing Sheets

FOREIGN PATENT DOCUMENTS

| | | | |
|---|---|---|---|
| EP | 1 081 410 A | | 3/2001 |
| JP | 59-69550 | * | 4/1984 |
| JP | 8-172883 | * | 7/1996 |
| JP | 2000-248960 | * | 12/2000 |
| JP | 2003-056647 | | 2/2003 |
| WO | WO 2005/093286 A1 | | 10/2005 |

OTHER PUBLICATIONS

European Search Report for European Patent Application No. EP 05 01 6992, dated Nov. 23, 2005 in 7 pages.

* cited by examiner

BALANCER SHAFT ARRANGEMENT FOR ENGINE

CROSS-REFERENCE TO RELATED APPLICATIONS

This application is based on and claims priority under 35 U.S.C. § 119 (a)-(d) to Japanese Patent Application No. 2004-237336, filed Aug. 17, 2005, the entire contents of which is hereby incorporated by reference.

BACKGROUND OF THE INVENTION

1. Field of the Invention

The present invention relates to an engine having a balancer shaft disposed in parallel with a crankshaft.

2. Description of the Related Art

Prior engines have employed a balancer device, which includes a balancer shaft and balancer weights, to suppress vibration due to the reciprocating motion of pistons and connecting rods in an engine. Japanese Patent Publication No. JP-A-2003-56647 discloses an example of such a balancer device. In the disclosed balancer device, the balancer shaft is journalled at its both ends through bearings disposed within a crankcase and orientated in parallel with a crankshaft. The balancer weights mounted on the balancer shaft on axially outer sides relative to the bearings.

With the conventional balancer device described above, however, a relatively large bending moment acts on bearing portions of the balancer shaft as the balancer weights are mounted at outer ends of the balancer shaft, which project beyond the bearings in a cantilever manner. Therefore, the balancer shaft needs to have a sufficiently large diameter size to endure the bending moment. In addition, since the bearings receive an offset load due to the balancer weights located on axially outer sides relative thereto, the service life of the bearings is relatively short.

A need therefore exists for an engine in which the bending moment acting on bearing portions of the balancer shaft and the offset loading acting on bearings is reduced, and in which upsizing of the diameter of the balancer shaft can be avoided and the service life of the bearings can be extended.

SUMMARY OF THE INVENTION

An aspect of the present invention involves an engine comprising a balancer shaft. The balancer shaft has longitudinal ends and is supported at its both ends through bearings by a crankcase. The shaft also is disposed generally in parallel with a crankshaft. The engine also includes a plurality of balancer weights. At least one balancer weight is disposed generally at each longitudinal end of the balancer shaft, and at least one of the weights comprises first and second weight portions. The first and the second weight are disposed on opposite axial sides of the corresponding bearing along the length of the balancer shaft.

By dividing at least one of the balancer weights so as to lie on opposite sides of the corresponding bearing, the bending moment acting on a bearing portion of the balancer shaft can be reduced. The diameter of the balancer shaft accordingly can be made smaller. Additionally, this construction lessens uneven loadings of the corresponding bearing, which consequently extends the service life of the bearing.

BRIEF DESCRIPTION OF THE DRAWINGS

The above-mentioned and other features of the invention disclosed herein are described below with reference to the drawings of a preferred embodiment. The illustrated embodiment is intended to illustrate, but not to limit, the invention. The drawings include the following three figures.

DETAILED DESCRIPTION OF THE PREFERRED EMBODIMENT

Figure 1:
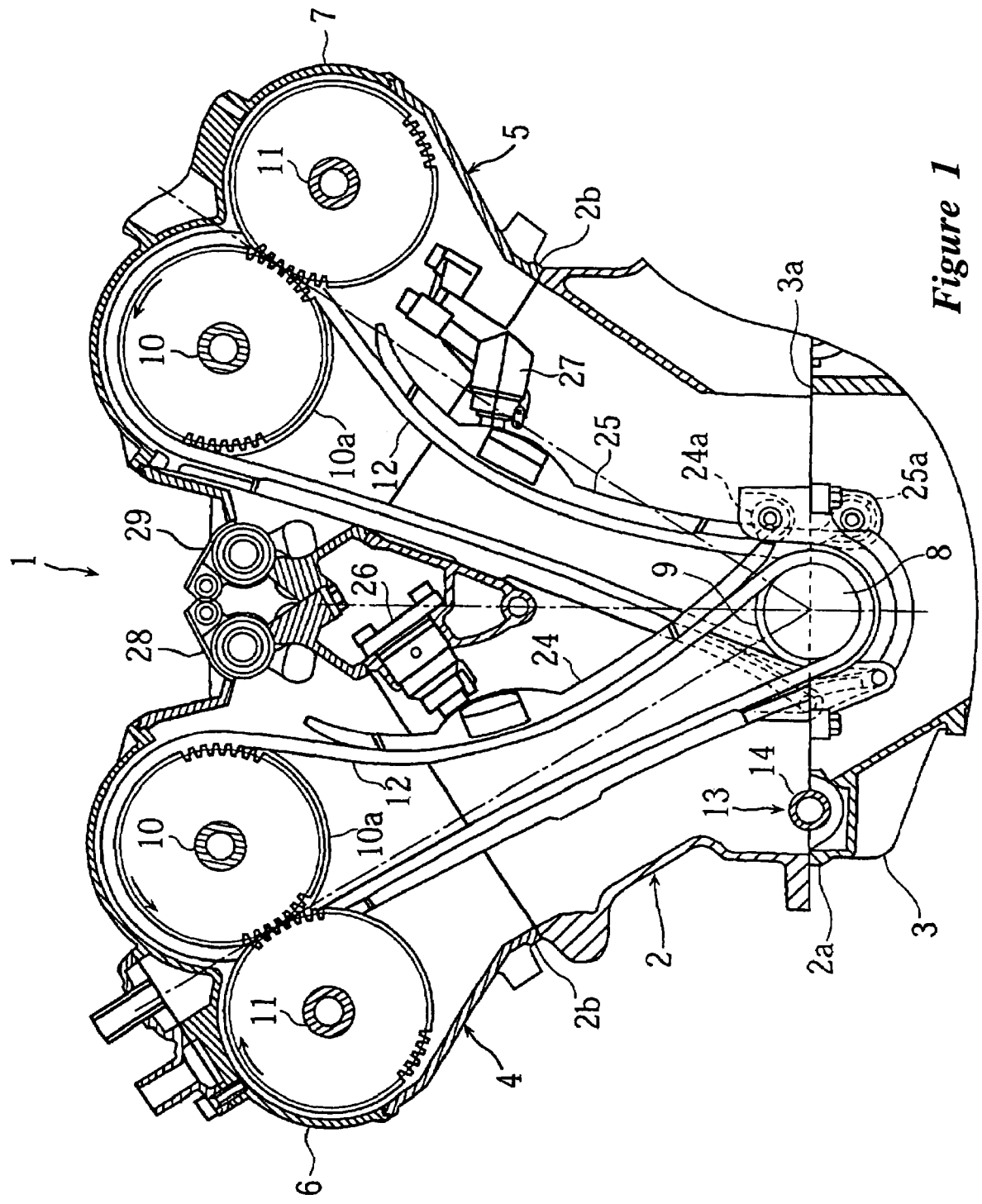
FIG. 1 is a sectional side view of an engine according to a preferred embodiment of the present invention.
Figure 2:
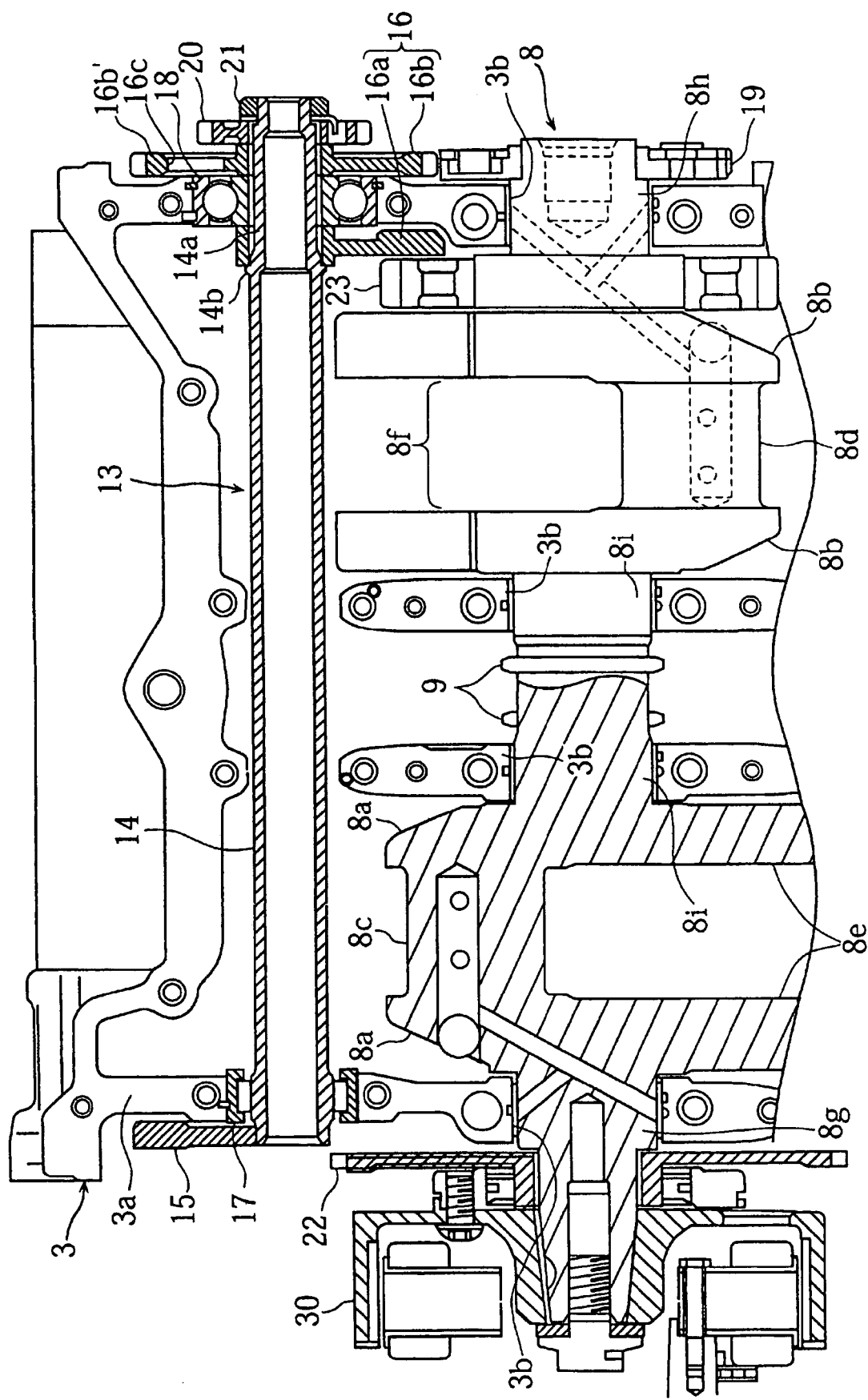
FIG. 2 is a partially sectional plan view showing the positional relationship between a crankshaft and a balancer shaft of the engine of FIG. 1.
Figure 3:
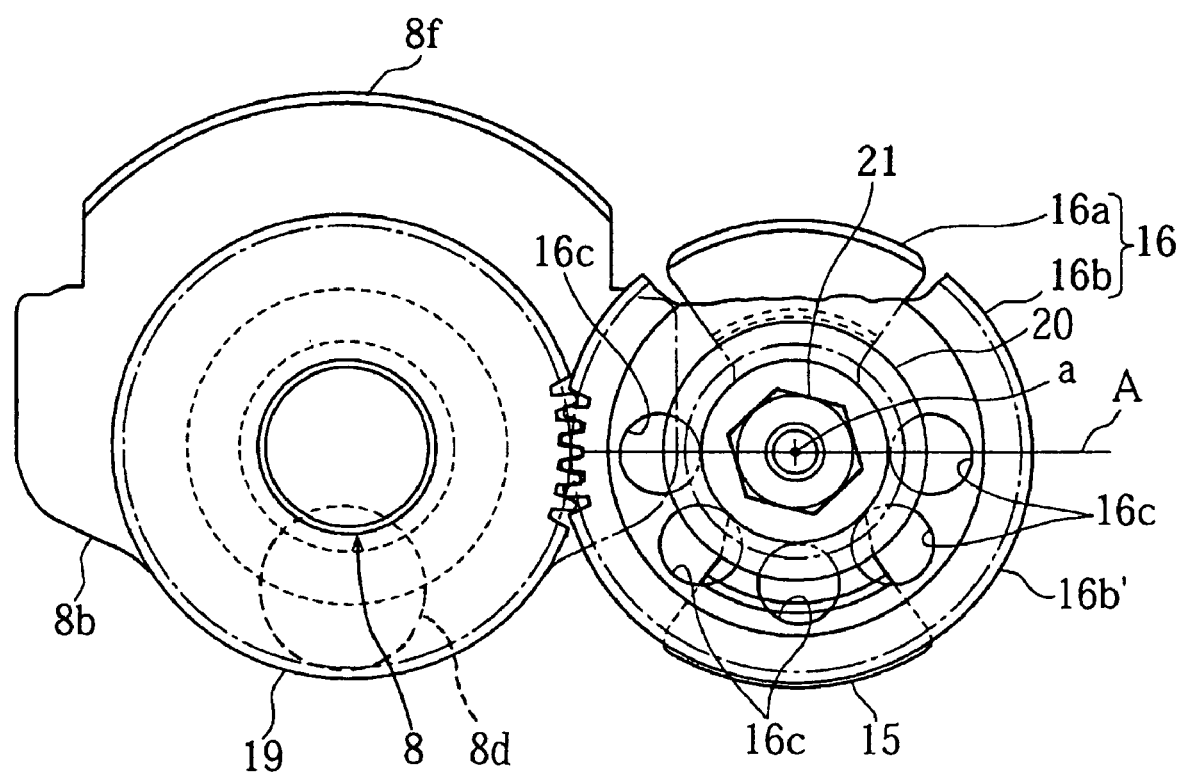
FIG. 3 is a partially sectional side view showing the positional relationship between the crankshaft and the balancer shaft of the engine of FIG. 1.

An embodiment of the present invention will be described below with reference to the accompanying drawings. FIGS. 1 through 3 illustrate an engine according to an embodiment of the present invention. In the drawings, reference numeral 1 denotes a water-cooled, four-stroke, V-type, four-cylinder engine, which has the following construction; however, the present balancer device can be used with other types and configurations of engines. The described engine thus is one type of engine on which the balancer device can be used. Additionally, while the engine I will be described with reference to the orientation shown in the drawings, it is understood that the engine can assume other orientations when used in practice, as will be understood by those skilled in the art.

A cylinder block 2 is formed with cylinder bores disposed to configure V-banks. A crankcase 3 is coupled to a lower mating face 2*a* of the cylinder block 2, and left and right cylinder heads 4, 5 are coupled to corresponding upper mating face 2*b*, 2*b* of the cylinder block 2. Head covers 6, 7 are mounted on top of the cylinder head 4, 5.

Although not shown in the drawings, a piston is disposed in each cylinder bore and is coupled to a crankshaft 8 via a corresponding connecting rod. With reference to FIG. 2, the crankshaft 8 has left and right crank arms 8*a*, 8*b*; and a left and a right crank pin 8*c*, 8*d* that are formed integrally with the crank arms 8*a*, 8*b* and eccentrically with respect to the axis of the crankshaft. The left crank pin 8*c* couples the left crank arms 8*a*, 8*a* with each other and the right crank pin 8*d* couple the right crank arms 8*b*, 8*b* with each other. Left and right crank weights 8*e*, 8*f* are formed integrally with the left and right crank arms 8*a*, 8*b* as projected on the opposite side of the crank pins 8*c*, 8*d*. The left and the right crank pin 8*c*, 8*d* are coupled to the connecting rods of the front and rear cylinders, respectively.

Outer journal portions 8*g*, 8*h*, which are formed on axially outer sides relative to the left and right crank arms 8*a*, 8*b*, and inner journal portions 8*i*, 8*i*, which are formed between the left and right crank arms 8*a*, 8*b* of the crankshaft 8, are journalled by corresponding journal bearings. Each journal bearing preferably is constructed with a block side journal bearing portion formed in the cylinder block 2 on the lower mating face 2*a* side, and a case side journal bearing portion 3*b* formed in the crankcase 3 on the upper mating face 3*a* side. The corresponding journal bearing portions functions as a bearing when the crankcase 3 and the cylinder block 2 are coupled to each other.

Reference numeral 30 denotes an alternator. The alternator 30 preferably is mounted on the crankshaft 8 at its portion projecting out of the crankcase; however, one or more engine components can be driven by the crankshaft 8 in addition to or in alternative to the alternator 30.

With reference to FIG. 1, an axially central portion of the crankshaft 8 is formed integrally with crank sprockets 9, 9 for driving camshafts 10, 11 of the engine. An intake camshaft 10 and an exhaust camshaft 11 are disposed within the cylinder head assembly and preferably on the upper mating face of each cylinder head 4. These shafts lie generally parallel with each other and the intake camshaft 10 is located internally of the V-bank (i.e., closer to the valley than the corresponding exhaust camshaft 11). An axially central portion of each intake camshaft 10 is formed with a cam sprocket 10a, which is connected to the crank sprocket 9 through a timing chain 12 or other suitable transmitter.

Reference numerals 24, 25 denote tensioner members for tension adjustment of the respective timing chains 12, 12. Lower ends 24a, 25a of the tensioner members 24, 25 preferably are pivotally supported on the lower mating face 2a of the cylinder block 2, and their upper portions are urged by urging members 26, 27, respectively, in directions of application of tension to the timing chains 12.

The engine 1 also includes hydraulic switching valves 28, 29 for switching operations of a variable valve timing mechanism (not shown). The two switching valves 28, 29 are disposed in the valley of the V-bank, with their axes lying generally in parallel with the crankshaft axis.

With reference to FIGS. 1 and 2, the engine 1 employs a balancer device 13 that cooperates with the crankshaft to reduce engine vibrations and to smooth engine operation. The balancer device 13 includes a balancer shaft 14 preferably, which is disposed generally in parallel with and generally in close proximity to the crankshaft 8, a left balancer weight 15 and a right balancer weight 16. The left balancer weight 15 is disposed at the left end of the balancer shaft 14, and the right balancer weight 16 is disposed at the right end of the balancer shaft 13.

FIG. 2 shows the balancer shaft 14 and the mating face 3a of the crankcase 3 as it is detached from the cylinder block 2 and viewed from the cylinder block 2 side. As shown in FIG. 1, the balancer shaft 14, which is generally cylindrical, preferably is disposed between the mating face 2a of the cylinder block 2 and the upper mating face 3a of the crankcase 3 and immediately next to (e.g., in front of) the crankshaft 8. With reference to FIGS. 1 and 2, the left and the right end of the balancer shaft 14 are journalled by a roller bearing 17 and a ball bearing 18, respectively, fitting in position in bearing grooves formed between the mating faces 2a, 3a.

The left balancer weight 15 is formed integrally with or secured on to (e.g., by press fitting to) the left end of the balancer shaft 14, and is disposed immediately on the axially outer side relative to the roller bearing 17.

The right balancer weight 16 is made up of an inner weight 16a disposed in abutment with the axially inner end face of the ball bearing 18, and an outer weight 16b disposed in abutment with the axially outer end face of the ball bearing 18.

The outer weight 16b preferably is also used as a balancer drive element. In the illustrated embodiment, the outer weight 16b functions as a driven gear and includes peripheral gear teeth 16b' that mesh with a drive gear 19 mounted on the crankshaft 8 to transmit the rotation of the crankshaft 8 to the balancer shaft 14 at the same speed. The balancer weight 16b can alternatively take the form of other driven elements, such as, for example, but without limitation, a driven wheel (e.g., a pulley or sprocket wheel).

The balancer weight 16b has an asymmetric weight distribution, which in the illustrated embodiment, is formed by weight reduction holes 16c disposed on one side with respect to a line "A" passing through an axis "a" of the balancer drive gear 16b' (in FIG. 3, on the lower side with respect to the line "A," which is opposite the inner weight 16a). The weight reduction holes 16c allow the balancer drive gear 16b' to function as a balancer weight, with its weight unevenly distributed on the other side (the side without the holes). Of course, the asymmetric weight distribution of the balancer weight 16b can be obtained by either adding or removing material asymmetrically to the annular structure of the weight.

As shown in FIG. 2, the balancer shaft 14 has a holding portion 14a formed at the right end thereof. The inner end of the holding portion 14a is formed integrally with a stopper boss 14b. The outside circumferential face of the holding portion 14a preferably is machined to have spline teeth. The components mounted on the holding portion 14 a include, in order from left to right: the inner weight 16a, the ball bearing 18, the outer weight 16b, and an accessory drive gear 20. These parts are securely held on the holding portion 14a as sandwiched between the stopper boss 14b and a nut 21 screwed on the outer end of the holding portion 14a. The weights 16a, 16b and the accessory drive gear 20 are in spline engagement with the holding portion 14a to rotate together with the balancer shaft 14.

The left balancer weight 15 and the right balancer weight 16 are disposed on axially outer sides relative to the outermost crank weights 8e, 8f, respectively. Specifically, the left balancer weight 15 is located in a space between the left side wall of the crankcase 3 and a starter gear 22 mounted on the left end of the crankshaft 8 outside the crankcase, and the inner weight 16a is located in a space between the right side wall of the crankcase 3 and a reduction wheel 23 mounted on the right end of the crankshaft 8 inside the crankcase.

In this embodiment, the right balancer weight 16 at the right end of the balancer shaft 14 is made up of the dedicated inner weight 16a and the outer weight 16b. The outer weight 16b can also be used as a gear. Further, the weights 16a, 16b hold the ball bearing 18 as sandwiched therebetween. Thus, the weight of the weights 16a, 16b acts on the ball bearing 18 in a well balanced manner, thereby reducing the bending moment which acts on bearing portions of the balancer shaft 14 and accordingly reducing the diameter of the balancer shaft 14. In addition, since the inner and outer weights are separately disposed on both sides of the bearing 18, the bearing 18 does not receive an uneven load and consequently has an extended service life.

As noted above, the inner weight 16a is a dedicated weight, and the outer weight 16b is also used as the gear 16b' for driving the balancer shaft. Thus, the number of parts is not increased even with the balancer weights separately disposed on both sides of the bearing 18.

The balancer weights 15, 16 are disposed on axially outer sides relative to the outermost crank weights 8e, 8f so that there is no interference between the balancer weights 15, 16 and the crank weights 8e, 8f. Therefore, the balancer shaft 14 can be installed in close proximity to the crankshaft 8 without increasing the size of the crankcase.

Additionally, because the left and the right balancer weight 15, 16 are disposed on axially outer sides relative to the outermost crank weights, the balancer weights 15, 16 are spaced far apart from each other in a direction parallel to the crankshaft axis. Consequently, the balancer weights can be have a smaller size, which in turns permits the engine to be more compact.

Although this invention has been disclosed in the context of a certain preferred embodiment and variations thereof, it will be understood by those skilled in the art that the present invention extends beyond the specifically disclosed embodiments to other alternative embodiments and/or uses of the invention and obvious modifications and equivalents thereof.

In addition, while a number of variations of the invention have been described, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. An engine comprising:
a crankshaft including a plurality of crank weights disposed along a length of the crankshaft;
a balancer shaft defining longitudinal ends and being supported at its ends through first and second bearings by a crankcase and being disposed generally in parallel with the crankshaft; and
a plurality of balancer weights including at least a first balancer weight disposed generally at a first longitudinal end of the balancer shaft and at least a second balancer weight disposed generally at a second longitudinal end of the balancer shaft, at least one of the first and second balancer weights comprising first and second weight portions, the first and the second weight portions being disposed on opposite axial sides of the first bearing along the length of the balancer shaft;
wherein the first balancer weight is disposed on an axially outer side of the balancer shaft relative to a first outermost crank weight and the second balancer weight is disposed on an axially outer side of the balancer shaft relative to a second outermost crank weight, wherein the first and second outermost crank weights are disposed at opposing ends of the crankshaft.

2. The engine of claim 1, wherein the first weight portion is configured as a gear and is disposed on one axial side of the first bearing, and the second weight portion is a dedicated weight and is disposed on the other axial side of the first bearing.

3. The engine of claim 1, wherein the first weight portion is drivingly coupled to the crankshaft of the engine.

4. The engine of claim 3, wherein the first weight portion includes gear teeth.

5. The engine of claim 4, wherein the gear teeth are disposed on an annular peripheral edge of the first weight portion.

6. The engine of claim 1, wherein the first weight portion has a annular shape and has an asymmetric weight distribution.

7. The engine of claim 6, wherein the first weight portion includes at least one hole.

8. The engine of claim 1, wherein the first weight portion is rotatably coupled to the balancer shaft.

9. The engine of claim 8, wherein the balancer shaft includes at least one spline and the first weight portion includes a hole with a corresponding groove to receive the spline to rotatably couple the first weight to the balancer shaft.

10. The engine of claim 1, wherein the first weight portion is removably coupled to the balancer shaft.

11. The engine of claim 1, wherein the balancer shaft includes a stopper boss against which the second weight portion is disposed.

12. The engine of claim 1, wherein the first and second weight portions are separable from the balancer shaft.

13. The engine of claim 1, wherein the first bearing is sandwiched between the first and second weight portions.

14. The engine of claim 1, wherein the first bearing, which is disposed between the first and second weight portions, is a ball bearing.

15. An engine comprising:
a crankshaft including a plurality of crank weights disposed along a length of the crankshaft;
a balancer shaft defining longitudinal ends and being supported at its ends through first and second bearings by a crankcase and being disposed generally in parallel with the crankshaft; and
a plurality of balancer weights with at least a first balancer weight being disposed generally at a first longitudinal end of the balancer shaft to the outer axial side of a first outermost crank weight and at least a second balancer weight disposed generally at a second longitudinal end of the balancer shaft to the outer axial side of a second outermost crank weight, wherein the first and second outermost crank weights are disposed at opposing ends of the crankshaft, at least one of the first and second balancer weights comprising first and second weight portions, the first and the second weight portions being disposed on opposite axial sides of the first bearing along the length of the balancer shaft, the first weight portion being configured as a gear and being disposed on one axial side of the first bearing, the second weight portion being a dedicated weight and being disposed on the other axial side of the first bearing.

16. The engine of claim 15, wherein the first weight portion is drivingly coupled to the crankshaft of the engine.

17. The engine of claim 15, wherein the first weight portion has an annular shape and has an asymmetric weight distribution.

18. The engine of claim 15, wherein the first weight portion is rotatably coupled to the balancer shaft.

19. The engine of claim 15, wherein the first and second weight portions are separable from the balancer shaft.

20. An engine comprising:
a crankshaft including a plurality of crank weights disposed along the length of the crankshaft;
a balancer shaft being supported at its both ends through bearings by a crankcase and being disposed generally in parallel with a crankshaft, the balancer shaft having longitudinal ends; and
a plurality of balancer weights disposed generally at each longitudinal end of the balancer shaft to the outer axial sides of the outermost crank weights that are disposed at opposing ends of the crankshaft, at least one of the balancer weights comprising first and second weight portions, the first and the second weight portions being disposed on opposite axial sides of a bearing along the length of the balancer shaft.

21. The engine of claim 20, wherein one of the plurality of balancer weights is disposed at a first longitudinal end of the balancer shaft on the axially outer side of the balancer shaft relative to a first outermost crank weight.

22. The engine of claim 21, wherein one of the plurality of balancer weights is disposed at a second longitudinal end of the balancer shaft on the axially outer side of the balancer shaft relative to a second outermost crank weight.

* * * * *

UNITED STATES PATENT AND TRADEMARK OFFICE
CERTIFICATE OF CORRECTION

PATENT NO. : 7,506,627 B2 Page 1 of 1
APPLICATION NO. : 11/205776
DATED : March 24, 2009
INVENTOR(S) : Yoshiharu Nakayama It is certified that error appears in the above-identified patent and that said Letters Patent is hereby corrected as shown below:

In column 1, line 9, please change "2005," to --2004,--.

In column 2, line 25, please change "I" to --1--.

Signed and Sealed this

Eighteenth Day of August, 2009

David J. Kappos
*Director of the United States Patent and Trademark Office*